United States Patent

Black

[15] 3,651,639
[45] Mar. 28, 1972

[54] ERROR COMPENSATED FLUIDIC TEMPERATURE SENSOR

[72] Inventor: Jay I. Black, Orange, Conn.
[73] Assignee: Avco Corporation, Stratford, Conn.
[22] Filed: Dec. 29, 1969
[21] Appl. No.: 888,220

[52] U.S. Cl. ..........................60/39.12, 60/39.28, 73/339 A, 137/81.5
[51] Int. Cl. ........................................F02b 43/00
[58] Field of Search............60/39.12, 39.28; 73/357, 339 A; 137/81.5

[56] References Cited

UNITED STATES PATENTS

| | | | |
|---|---|---|---|
| 3,017,749 | 1/1962 | Heppler | 60/39.28 |
| 3,451,411 | 6/1969 | Johnson | 137/81.5 |
| 3,465,775 | 9/1969 | Rose | 137/81.5 |
| 3,491,797 | 1/1970 | Taplin | 137/81.5 |
| 3,403,509 | 10/1968 | Eastman | 60/39.28 |
| 3,416,310 | 12/1968 | Boothe | 60/39.28 |
| 3,427,881 | 2/1969 | Steinberg | 73/339 A |
| 3,451,269 | 6/1969 | Johnson | 73/339 A |
| 3,494,195 | 2/1970 | Kelley | 73/357 X |

*Primary Examiner*—Clarence R. Gordon
*Attorney*—Charles M. Hogan and Gary M. Gron

[57] ABSTRACT

The disclosure illustrates a fluidic oscillator used to measure the temperature at the turbine inlet of a gas turbine engine. The oscillator has a housing with a resonant chamber connected to the hot gas stream and to a low pressure discharge so that pressure oscillations are set up in the resonant chamber. A transducer and an analog device convert the frequency of the pressure oscillations into a DC analog signal. The housing of the oscillator is cooled and a thermocouple and modifying circuitry are used to compensate the analog signal for the heat transfer from the oscillator housing to the cooling air. In another embodiment, a heat flow sensor is used to compensate the analog signal.

10 Claims, 2 Drawing Figures

Patented March 28, 1972

3,651,639

INVENTOR.
JAY I. BLACK
BY Charles M. Hogan
Gary M. Gron
ATTORNEYS.

ERROR COMPENSATED FLUIDIC TEMPERATURE SENSOR

The present invention relates to fluidic temperature sensors and more specifically to sensors of this type which utilize fluidic oscillators.

It has long been known that a fluidic oscillator oscillates at a frequency dependent upon the geometry constants of its resonant chamber and by the absolute temperature of the gas in the chamber. This principle has been applied to many temperature sensing applications because of its simplicity, ruggedness and fast response.

One of the prime applications for this type of temperature sensor is the turbine inlet temperature of a gas turbine engine. A fluidic oscillator is capable of operating when exposed to the over 2,000° F. turbine inlet temperatures found in high performance gas turbine engines.

It has been found, however, that to use the fluidic oscillator for prolonged periods at these elevated temperatures it is necessary to cool the housing of the oscillator. An example of an approach in cooling the oscillator may be found in copending application Ser. No. 880,528, filed Nov. 28, 1969, entitled "Mounting of Fluidic Temperature Sensor in Gas Turbine Engines", of common inventorship and assignment with the present invention.

It has been found that with the above approach wherein the oscillator housing is cooled that the frequency signal emanating from the oscillator has an error because of the heat loss from the oscillator housing to the cooling medium. One approach in compensating for this error may be found in copending application Ser. No. 880,527, filed Nov. 28, 1969, entitled "Signal Error Compensated Fluidic Oscillator Temperature Sensors", of common inventorship and assignment with the present invention. That application provides an excellent means for compensating for the error when the cooling air is maintained at a constant temperature. In practice, however, the cooling air temperature will vary to some degree.

Accordingly, it is an object of the present invention to compensate for signal errors of a fluidic oscillator used to measure the temperature of a dynamically changing fluid.

These ends are achieved in a fluidic temperature sensor comprising an oscillator of the above general type by providing a means which generates a signal derived from the frequency of the pressure oscillations in the resonant chamber of the oscillator. A means is provided for modifying the frequency derived signal in proportion to the heat transfer from the housing of said oscillator whereby the modified signal is directly proportional to the temperature of the fluid at the inlet to the oscillator.

The above and other related objects and features of the present invention will be apparent from a reading of the description shown in the accompanying drawings and the novelty thereof pointed out in the appended claims.

Figure 1:
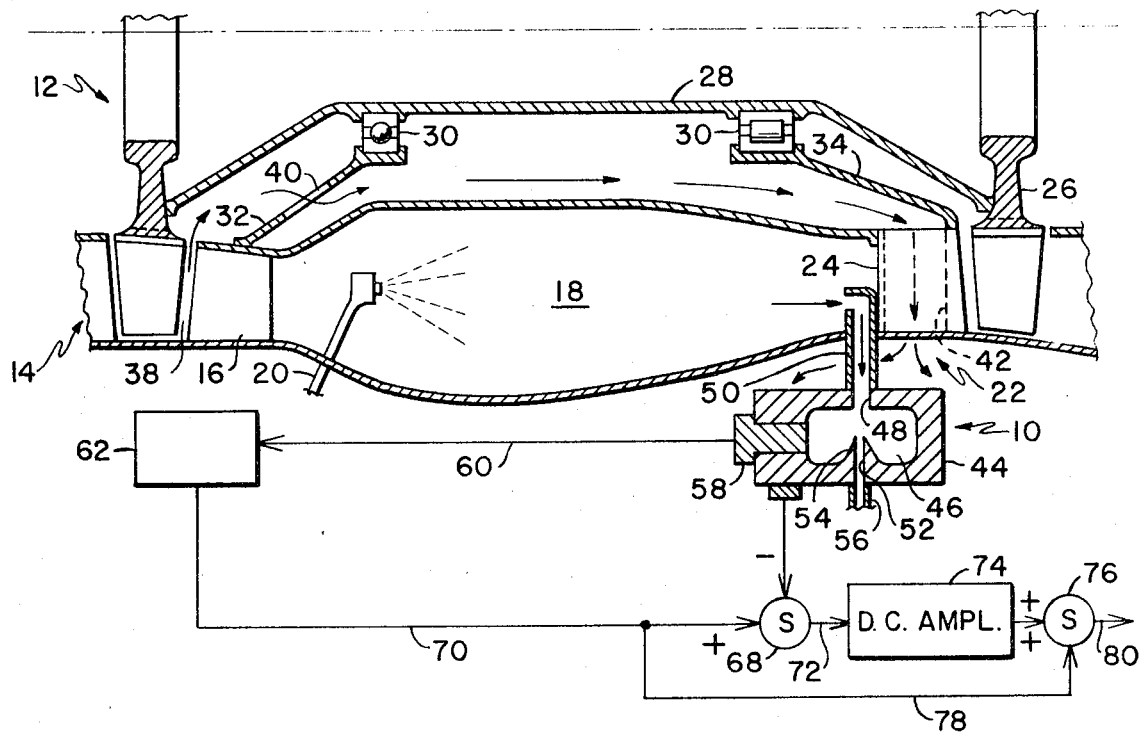
FIG. 1 is a simplified view of a fluidic temperature sensor embodying the present invention, along with cooperating elements of a gas turbine engine with which it may be used.

Reference is directed to FIG. 1 which shows a fluidic temperature sensor, generally indicated by reference character 10 which may be used with a gas turbine engine 12. The engine 12 comprises a compressor assembly 14 (only the last stages are shown for simplification) which pressurizes air for discharge through a diffuser 16 to a combustor 18. A fuel nozzle 20 receives fuel from a suitable source and injects it into the combustor 18 where it is mixed with the pressurized air and ignited to provide a propulsive gas stream. The hot gas stream passes through a turbine nozzle assembly 22 comprising a series of vanes 24. From there the stream passes across a turbine rotor 26 which extracts a portion of the energy from the stream to drive the compressor assembly 14 through a shaft assembly 28. From the turbine rotor 26 the hot gas stream may be discharged across a power turbine or through a jet nozzle to provide a reaction propulsion thrust. The shaft assembly 28 is journaled in suitable bearing assemblies 30, supported in conical structural members 32 and 34.

The turbine nozzle vanes 24 are cooled by compressor discharge air which passes across gap 38 upstream of the compressor diffuser 16, through opening 40 in conical structural member 32 and radially outward through internal passages 42 in vanes 24. Additional passages may be formed to enable discharge of cooling air along the leading and trailing edges of the vanes 24.

The temperature at the inlet to the turbine assembly is frequently necessary to be measured. Among the reasons for measuring this temperature is to provide a control parameter for a fuel control assembly or indicate abnormally high turbine inlet temperatures. The fluidic temperature sensor 10 may be employed for this purpose.

The temperature sensor 10 comprises a fluidic oscillator having a housing 44 in which a resonant chamber 46 is formed. An inlet port 48 and conduit 50 connect the hot gas stream at the turbine nozzle inlet to the resonant chamber 46. An outlet port 52 extends from a pair of splitters 54 to a conduit 56 leading to a discharge which has a pressure level sufficiently low to enable the splitters 54 to promote pressure oscillations in the resonant chamber 46. As discussed previously, the pressure oscillations are dependent upon the geometry constant of the oscillator and the temperature of the gas within the chamber.

The frequency of the pressure oscillations is measured by a transducer 58. Many transducers may be employed but it has been found that a transducer converting the pressure oscillations to electrical pulses has been most suitable. The signal from the transducer 58 is fed via line 60 to an analog device 62 which converts the signal from the transducer 58 to an analog signal. In the embodiment illustrated, the device 62 converts the frequency pulses to a DC voltage signal directly proportional to the frequency of the pulses.

Since the oscillator 10 is being used to measure greatly elevated temperatures (sometimes over 2,000° F.), it is necessary to cool the housing 44 to enable prolonged operation. For this purpose the cooling air from the turbine nozzle vanes 24 is passed across the housing 44 of the oscillator.

The circuitry described below modifies the signal from the analog device 62 in proportion to the heat transferred from the housing 44 of the fluidic oscillator. As a result, the modified signal is directly proportional to the temperature of the hot gas stream at the inlet to the turbine of the gas turbine engine. This circuitry comprises a thermocouple 64 embedded in the housing 44 so that it remains at the same temperature. Thermocouple 64 generates a DC voltage which is passed through line 66 to a summing device 68. The summing device 68 receives an input via line 70 from analog device 62 and is adapted to subtract the thermocouple voltage from the analog device signal. The resultant signal is fed via line 72 to a multiplier (herein shown as a DC amplifier 74) to another summing device 76. The summing device 76 adds the signal from the amplifier 74 to the voltage signal from the analog device 62 via lines 70 and 78 to produce an output signal on line 80.

The operation of the system shown in FIG. 1 may be understood by referring to the following equation:

$$T_5 = T_c + U' \, A/W_{a_5} \, C_p \, (T_c - T_{w_o}) + V^2 \, avg/2gJC_p$$

where $T_5$ = Turbine inlet temperature,
$T_c$ = Temperature of the gas in the resonant chamber 46,
$U'$ = Thermal transmittance of oscillator housing 44,
$A$ = Areas of the walls of oscillator housing 44,
$W_{a_5}$ = Net mass flow of gas through resonant chamber 46,
$C_p$ = Specific heat at constant pressure,
$T_{w_o}$ = Outside wall temperature of oscillator housing 44,
$V^2$ avg = Average velocity of the gas flow through the sensor,
$g$ = Gravitational constant,
$J$ = Mechanical equivalent of heat.

The term $V^2 avg/2gJC_p$ is a constant at normal operational engine speeds when choked flow is established across the fluidic oscillator. This may be easily used to bias the signal from line 80 by a constant amount. The term $U' A/w_{a_5} C_p$ for this system is regarded as substantially constant, although, as later shown, the term $W_{a\,5}$ varies somewhat. This term is used to set the amplification level of the DC amplifier 74.

Therefore, the signal on line 70 represents $T_c$ and the signal on line 66 represents $T_{w_0}$ which is subtracted from $T_c$ and multiplied by the constant $U' A/W_{a_5} C_p$ by multiplying through the DC amplifier 74. The temperature of the chamber on line 70 is added to the output of the DC amplifier to produce a signal on line 80 which represents $T_s$.

The net result of the system above is to add to the frequency derived signal reflecting the temperature in the resonant chamber 46, the signal error reflecting the heat loss from the oscillator housing. This type of system automatically compensates for changes in the ambient temperatures since the thermocouple 64 responds to the differing heat transfer rates caused by variations in the cooling air flow.

Figure 2:
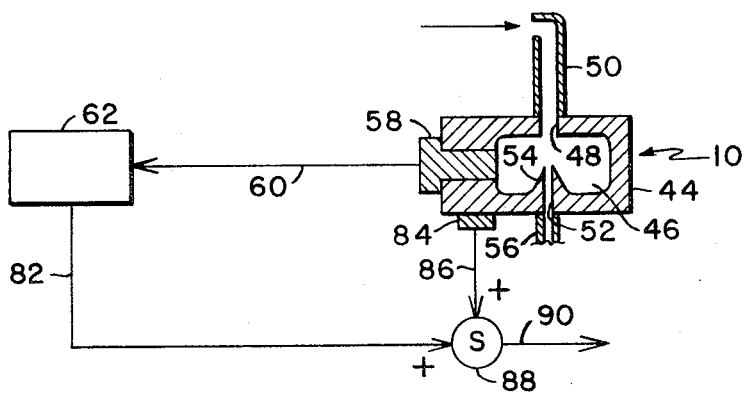
FIG. 2 is a simplified view of a fluidic temperature sensor illustrating an alternate embodiment of the present invention.

It has been stated previously that the term $U' A/W_{a_5} C_p$ is substantially constant. This term in practice, however, changes somewhat and introduces a small amount of error. To compensate for this, the system shown in FIG. 2 is employed. In this figure the amplifier 10 has the transducer 58 connected to the resonant chamber 46 to produce the signal via line 60 to the device 62 which provides a DC analog signal directly proportional to the frequency of the pressure oscillations in resonant chamber 46. A heat flow sensor 84 is embedded in the wall of the oscillator housing 44 and provides a DC signal through line 86 directly proportional to the heat transferred from the housing 44 of the oscillator. Many heat flow sensors may be employed for this purpose but it has been found that the heat flow sensor Model No. 20472-3, manufactured by the RDF Corporation, Hudson, New Hampshire, is particularly effective. The signal from line 86 is added to the signal from line 82 by a summing device 88 which produces an output signal on line 90. The operation of this device is as follows: Assuming that the last term of the equation discussed above has been compensated for, the term $U' A/W_{a_5} C_p (T_c - T_{w_0})$ represents the actual heat transfer from the oscillator housing 44. Therefore, the output from the heat flow sensor 84 directly reflects the total value of this equation and may be simply added to the frequency derived signal on line 82 to produce a compensated output signal on line 90 that compensates for the heat loss from the oscillator housing 44, irrespective of any variations in the mass flow of the air through the sensor.

The above fluidic temperature sensor is not limited for use solely in a gas turbine engine. It may be employed for other purposes in measuring fluid temperature. Furthermore, it is not necessary that the temperature of the gas to be measured be higher than the temperature flowing over the oscillator housing 44. There may be instances in other applications that the ambient temperature surrounding the oscillator housing 44 is higher than the temperature of the fluid being measured. In this case the heat transfer into the oscillator housing would be compensated for. By compensating for the heat loss of the oscillator housing, the accuracy of the temperature sensor is greatly enhanced when it is used to measure fluids whose temperatures vary at dynamic rates, such as in gas turbine engines, because the only lag in the signal is the extremely short lag caused by purging of the gas from the resonant chamber 46.

While the preferred embodiment of the present invention has been shown, it is apparent that those skilled in the art may employ the invention otherwise than as shown without departing from the spirit of the present invention. Accordingly, its scope is to be determined solely by the appended claims.

Having thus described the invention, what is claimed as novel and desired to be secured by Letters Patent of the United States is:

1. Temperature sensing apparatus comprising:

a fluidic oscillator comprised of a housing with a resonant chamber formed therein, an inlet connected to a fluid whose temperature is to be measured and an outlet extending to a discharge having a pressure level sufficiently lower than said inlet whereby pressure oscillations dependent upon the temperature of the fluid in said chamber are set up;

means for generating a signal derived from the frequency of the pressure oscillations in said chamber and proportional to the temperature of the fluid in said resonant chamber;

means for modifying said frequency derived signal in proportion to the heat transfer from the housing of said fluidic oscillator whereby the modified signal is directly proportional to the temperature of the fluid at the inlet to said oscillator.

2. Temperature sensing apparatus as in claim 1 wherein said modifying means acts on said frequency derived signal in proportion to the temperature differential between the oscillator housing and the resonant chamber.

3. Temperature sensing apparatus as in claim 2 wherein:

said frequency derived signal means generates an analog signal in direct proportion to the temperature in said resonant chamber;

said modifying means comprises:

means for generating an analog signal in direct proportion to the temperature of said oscillator housing;

means for generating an analog signal directly proportional to the difference in temperature between the oscillator housing and the resonant chamber multiplied by a constant reflecting the heat transfer coefficient of said housing;

and means for summing the signal from said frequency derived signal means and the signal from said modifying means for producing an output signal directly proportional to the temperature of said fluid in the inlet to said oscillator.

4. Temperature sensing apparatus as in claim 3 wherein said oscillator housing signal means comprises a thermocouple embedded in the oscillator housing.

5. Temperature sensing apparatus as in claim 1 wherein said modifying means acts on said frequency derived signal in direct proportion to the quantity of heat transferred from the housing of said fluidic oscillator.

6. Temperature sensing apparatus as in claim 5 wherein:

said frequency derived signal means generates an analog signal in direct proportion to the temperature of the fluid in said resonant chamber;

said modifying means comprises:

means for generating an analog signal directly proportional to the heat transfer from said oscillator housing; and means for summing said analog signals to generate an output signal directly proportional to the temperature of the fluid at the inlet to said fluidic oscillator.

7. Temperature sensing apparatus as in claim 6 wherein said heat transfer means comprises a device for generating a signal reflecting the heat transfer from said oscillator housing over a defined area.

8. In combination:

a gas turbine engine having a compressor for pressurizing air for delivery to a combustor wherein a hot gas stream is generated and discharged through a turbine nozzle across a turbine assembly which drives said compressor;

a fluidic oscillator comprising a resonant chamber and an inlet connected to said hot gas stream upstream of said turbine nozzle and an outlet connected to a low pressure discharge so that the hot gas stream passing through said resonant chamber experiences pressure oscillations proportional to the temperature of the gas in the chamber;

means for providing a flow path for cooling air from the outlet of said compressor across said fluidic oscillator whereby heat is lost from the oscillator to the cooling air;

means for providing a signal derived from the frequency of the pressure oscillations in said chamber and proportional to the temperature of the fluid in said resonant chamber;

means for modifying said frequency derived signal in proportion to the heat loss from the housing of said fluidic oscillator whereby the modified signal is directly proportional to the temperature of the hot gas stream at the inlet to said oscillator.

9. Apparatus as in claim 8 wherein:

said frequency derived signal means generates an analog signal in direct proportion to the temperature in said resonant chamber;

said modifying means comprises:

means for generating an analog signal in direct proportion to the temperature of said oscillator housing;

means for generating an analog signal directly proportional to the difference in temperature between the oscillator housing and the resonant chamber multiplied by a constant reflecting the heat transfer coefficient of said housing;

means for summing the signal from said frequency derived signal means and the signal from said modifying means for producing an output signal directly proportional to the temperature of said fluid in the inlet to said oscillator.

10. Apparatus as in claim 8 wherein:

said frequency derived signal means generates an analog signal in direct proportion to the temperature of the fluid in said resonant chamber;

said modifying means comprises:

means for generating an analog signal directly proportional to the heat transfer from said oscillator housing; and means for summing said analog signals to generate an output signal directly proportional to the temperature of the fluid at the inlet to said fluidic oscillator.

* * * * *